US008705632B2

(12) United States Patent
Vannerson et al.

(10) Patent No.: US 8,705,632 B2
(45) Date of Patent: Apr. 22, 2014

(54) DECODER ARCHITECTURE SYSTEMS, APPARATUS AND METHODS

(75) Inventors: Eric F. Vannerson, Phoenix, AZ (US); Kalpesh D. Mehta, Chandler, AZ (US); Louis A. Lippincott, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 1559 days.

(21) Appl. No.: 11/093,732

(22) Filed: Mar. 30, 2005

(65) Prior Publication Data

US 2006/0222000 A1     Oct. 5, 2006

(51) Int. Cl.
*H04N 7/12*     (2006.01)

(52) U.S. Cl.
USPC .................................. 375/240.25

(58) Field of Classification Search
USPC .................................. 375/240.25
See application file for complete search history.

(56) References Cited

U.S. PATENT DOCUMENTS

| | | | | |
|---|---|---|---|---|
| 2003/0059118 | A1* | 3/2003 | Suzuki | 382/233 |
| 2003/0185305 | A1* | 10/2003 | MacInnis et al. | 375/240.25 |
| 2003/0188127 | A1* | 10/2003 | So | 712/34 |
| 2005/0060577 | A1* | 3/2005 | Barrett et al. | 713/201 |

FOREIGN PATENT DOCUMENTS

| | | |
|---|---|---|
| EP | 1351511 A2 | 10/2003 |
| WO | WO-03085494 A2 | 10/2003 |
| WO | WO-2006105544 A1 | 10/2006 |

OTHER PUBLICATIONS

"International Search Report for corresponding PCT Application No. PCT/US/2006/012985", (Aug. 11, 2006), 4 pgs.
Hashimoto, T., et al., "A 27-MHz/54-MHz 11-mW MPEG-4 Video Decoder LSI for Mobile Applications", *IEEE Journal of Solid-State Circuits*, 37(11), (Nov. 2002), 1574-1581.
Rutten, M., et al., "Application Design Trajectory towards Reusable Coprocessors—MPEG Case Study", *2nd Workshop on Embedded Systems for Real-Time Multimedia (ESTImedia 2004)*, (Sep. 26, 2004), 33-38.
European Application Serial No. 06749485.6, Office Action mailed Jan. 30, 2009, 14 pgs.
Taiwanese Application Serial No. 95110904, Office Action mailed May 14, 2009, 13 pgs.
200680004476.6, "Chinese Application Serial No. 200680004476.6, Office Action mailed Apr. 24, 2009", 108 pgs.
Office Action Received for Japanese Patent Application No. 2008-504541, mailed on Jun. 1, 2010, 4 pages of Japanese office action, including 2 pages of English translation.
Office Action Received for Korean Patent Application No. 2007-7024958, mailed on Aug. 31, 2009, including 2 pages of English translation.
International Preliminary Report on Patentability for PCT Patent Application No. PCT/US2006/012985, mailed on Oct. 11, 2007, 10 pages.

* cited by examiner

*Primary Examiner* — Richard Torrente
(74) *Attorney, Agent, or Firm* — Trop, Pruner & Hu, P.C.

(57) ABSTRACT

An apparatus includes a decoder to receive a compressed bit stream that is based on a coding standard. The decoder includes a hardware accelerator to decode a part of the compressed bit stream that is based on an operation that is common across multiple coding standards that includes the coding standard. The decoder also includes a programmable element to decode a part of the compressed bit stream that is based on an operation that is specific to the coding standard.

13 Claims, 4 Drawing Sheets

DECODER ARCHITECTURE SYSTEMS, APPARATUS AND METHODS

TECHNICAL FIELD

The application relates generally to data processing, and, more particularly, to decoding of data.

BACKGROUND

Encoding, transmitting, and decoding of different types of signals can be a bandwidth intensive process. Typically, an analog signal is converted into a digital form and transmitted as a bit stream over a suitable communication network. After the bit stream arrives at the receiving location, a decoding operation converts the data back to an analog signal. However, the encoding and decoding operations may be based on a number of different standards (e.g., Moving Pictures Experts Group (MPEG)-2, MPEG-4, Windows Media (WM)-9, etc.). Accordingly, the logic used to perform the encoding and decoding operations must be designed to process one or more of these standards.

BRIEF DESCRIPTION OF THE DRAWING

Embodiments of the invention may be best understood by referring to the following description and accompanying drawing that illustrate such embodiments. The numbering scheme for the Figures included herein is such that the leading number for a given reference number in a Figure is associated with the number of the Figure. For example, a system 100 can be located in FIG. 1. However, reference numbers are the same for those elements that are the same across different Figures. In the drawings.

DETAILED DESCRIPTION

Embodiments of the invention are described in reference to a video decoding operation. However, embodiments are not so limited. Embodiments may be used in any of a number of different applications (encoding operations, etc.).

Figure 1:
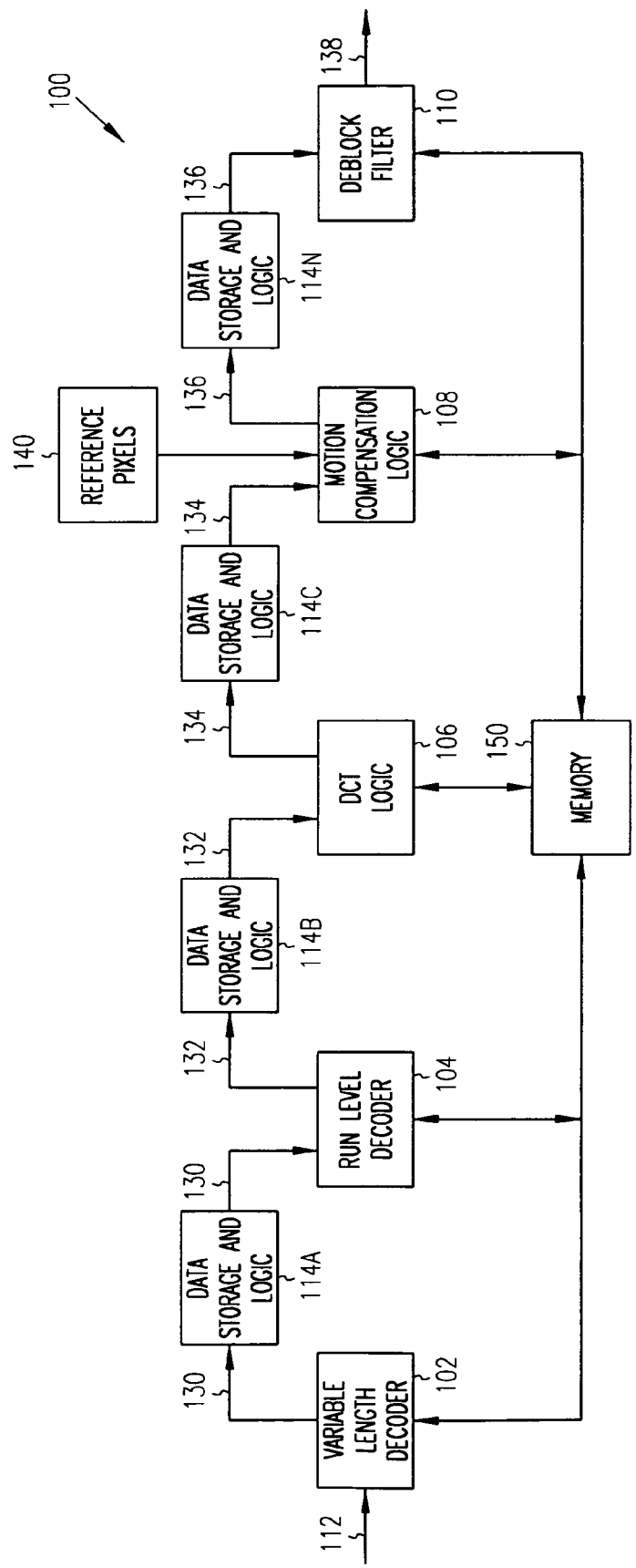
FIG. 1 illustrates a block diagram of a video decoder, according to some embodiments of the invention.

FIG. 1 illustrates a block diagram of a video decoder, according to some embodiments of the invention. In particular, FIG. 1 illustrates a system 100 that includes a variable length decoder 102, a run level decoder 104, a Discrete Cosine Transform (DCT) logic 106, a motion compensation logic 108, a deblock filter 110, data storage and logic 114A-114N and a memory 150. The variable length decoder 102, the run level decoder 104, the DCT logic 106, the motion compensation logic 108 and the deblock filter 110 may be representative of hardware, software, firmware or a combination thereof.

The data storage and logic 114A-114N and the memory 150 may include different types of machine-readable medium. For example, the machine-readable medium may be volatile media (e.g., random access memory (RAM), magnetic disk storage media, optical storage media, flash memory devices, etc.). The machine-readable medium may be different types of RAM (e.g., Synchronous Dynamic RAM (SDRAM), DRAM, Double Data Rate (DDR)-SDRAM, etc.).

The variable length decoder 102 is coupled to receive a compressed bit stream 112. In some embodiments, the compressed bit stream 112 may be encoded data that is coded based on any of a number of different decoding standards. Examples of the different coding standards include Motion Picture Experts Group (MPEG)-2, MPEG-4, Windows Media (WM)-9, etc. For more information regarding various MPEG-2 standards, please refer to "International Organization for Standardization (ISO)/International Electrotechnical Commission (IEC) 13818-2:2000 Information Technology—Generic Coding of Moving Pictures and Associated Audio Information: Video" and related amendments. For more information regarding various MPEG-4 standards, please refer to "ISO/IEC 14496 Coding of Audio-Visual Objects—Part 2: Video" and related amendments. A more detailed description of the packets 114 and the generation thereof by the variable length decoder 102 is set forth below.

As further described below, the variable length decoder 102 may generate sequence packets, frame packets and macroblock packets 130 based on the compressed bit stream 112. The variable length decoder 102 may store the sequence packets, the frame packets and the headers of the macroblock packets into the memory 150. The variable length decoder 102 may store body of the macroblock packets into the data storage and logic 114A. As shown, the variable length decoder 102, the run level decoder 104, the DCT logic 106, the motion compensation logic 108 and the deblock filter 110 are coupled to the memory 150. Therefore, the run level decoder 104, the DCT logic 106, the motion compensation logic 108 and the deblock filter 110 may access the sequence packets, the frame packets and the headers of the macroblock packets in the memory 150 for processing of the body of the macroblock packets.

The run level decoder 104 is coupled to receive the bodies of the macroblock packets 130 from the data storage and logic 114A. The run level decoder 104 may generate coefficient data 132 based on this information. The run level decoder 104 is coupled to store the coefficient data 132 into the data storage and logic 114B. The DCT logic 106 is coupled to receive the coefficient data 132 from the data storage and logic 114B. The DCT logic 106 may generate pixels 134 based on the coefficient data 132. For example, the DCT logic 106 may generate pixels for I-frames or residues for the P-frames. The DCT logic 106 is coupled to store the pixels 134 into the data storage and logic 114C.

The motion compensation logic 108 is coupled to receive the pixels 134 from the data storage and logic 114C and to receive reference pixels 140. The motion compensation logic 108 may generate pel data 136 based on the pixels 134 and the reference pixels 140. The motion compensation logic 108 is coupled to store the pel data 136 into the data storage and logic 114N. The deblock filter 112 is coupled to receive the pel data 136 from the data storage and logic 114N. The deblock filter 112 may generate pel output 122 based on the pel data 136.

A more detailed description of the variable length decoder 102 is set forth below. In some embodiments, the compressed bit stream 112 may have been encoded based on any of a number of coding standards. One or more of the standards may require at least some operations that are specific to that standard. The variable length decoder 102 does not necessarily perform the decode operations for each standard differently. Rather, there are some core operations of the decode operations that are common across the different standards. Examples of such core operations are described in more detail below.

In some embodiments, the variable length decoder 102 may include a hardware accelerator and a programmable element. In some embodiments, the programmable element may control the operation of the hardware accelerator. Additionally, the programmable element may perform operations that are unique/specific to a particular coding standard. The hardware accelerator may perform core operations that may be common across multiple coding standards. In some embodiments, the standards may vary based on the sequence of these core functions.

Accordingly, the variable length decoder 102 allows for faster execution of the core functions, while allowing for the programmability across the different standards. While this architecture that includes a partition between a hardware accelerator and a programmable element is described with reference to the variable length decoder 102, in some embodiments, this architecture may be incorporated into the other components of the system 100 (e.g., the run level decoder 104, the DCT logic 106, the motion compensation logic 108 and the deblock filter 110).

Figure 2:
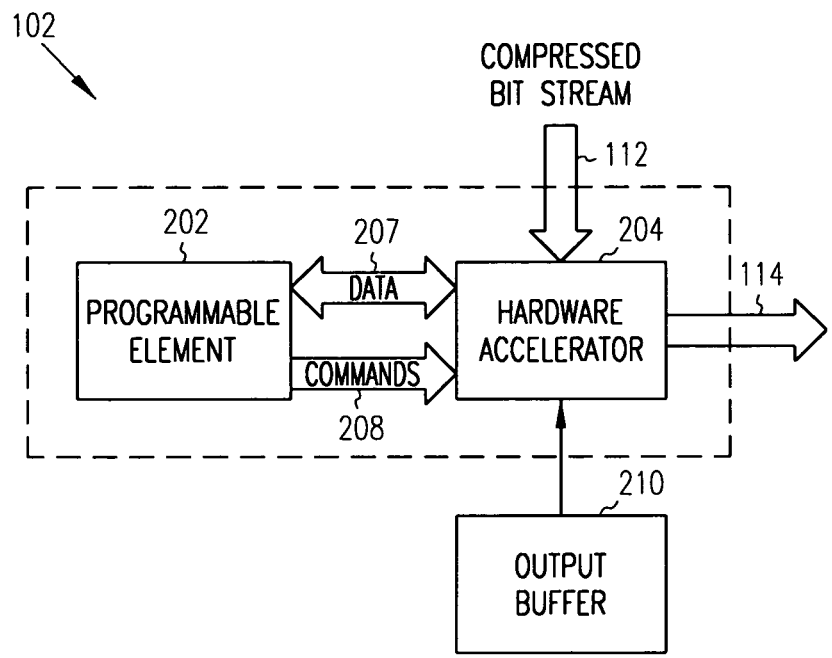
FIG. 2 illustrates a more detailed block diagram of a variable length decoder, according to some embodiments of the invention.

FIG. 2 illustrates a more detailed block diagram of a variable length decoder, according to some embodiments of the invention. In particular, FIG. 2 illustrates a more detailed block diagram of the variable length decoder 102, according to some embodiments of the invention. The variable length decoder 102 includes a programmable element 202 and a hardware accelerator 204. The hardware accelerator 204 includes an output buffer 210.

The hardware accelerator 204 receives the compressed bit stream 112. The hardware accelerator 204 is coupled to transmit and receive data through a data channel 207 to and from the programmable element 202. The programmable element 202 is also coupled to transmit commands through a command channel 208 to the hardware accelerator 204 for control thereof. Both the programmable element 202 and the hardware accelerator 204 may access the output buffer 210. For example, the programmable element 202 and the hardware accelerator 204 may store the packets (including the sequence, frame and macroblock packets) into the output buffer 210. In some embodiments, the programmable element 202 and the hardware accelerator 204 may use the output buffer 210 in generating the packets. For example, one or more operations by the programmable element 202 and the hardware accelerator 204 may generate a first part of a packet (e.g., a header of one of the packets), which is intermediately stored in the output buffer 210. Subsequently, one or more operations by the programmable element 202 and the hardware accelerator 204 may generate a second part of the packet (e.g., the body of this packet). The programmable element 202 or the hardware accelerator 204 may generate the packet based on the two different parts.

The programmable element 202 may transmit a control command through the command channel 208 to the hardware accelerator 204, thereby causing the hardware accelerator 204 to output these packets for storage into the memory 150 and the data storage and logic 114A. In some embodiments, both the programmable element 202 and the hardware accelerator 204 decode different parts of the compressed bit stream 112.

For example, the programmable element 202 may decode the bitstream that is specific to a particular standard. The hardware accelerator 204 may be programmed by the programmable element 202 to perform the decoding operations that are common to the standards. In other words, the hardware accelerator 204 may perform various core operations that may be common across a number of standards.

Examples of core operations may relate to parsing of the bits in the bit stream. For example, a core operation may include locating a pattern of bits in the bit stream. The core operation may include locating a variable length code in the bit stream. For example, the core operation may include locating a specified start code in the bit stream. In some embodiments, the core operation may include the decoding of the bits in the bit stream. The core operation may retrieve a number of bits from the bit stream and may decode such bits. In particular, the core operation may perform a look-up into a table (based on the retrieved bits). The hardware accelerator 204 may then interpret the decoded bits as index, (run, level, last) triplet, etc. In some embodiments, the hardware accelerator 204 may output the decoded bits from the variable length decoder 102 without further processing by the programmable element 202. Alternatively, the hardware accelerator 204 may return the result of the decode operation to the programmable element 202 for further processing. In some embodiments, the programmable element 202 may output either packed or unpacked formatted data to the hardware accelerator 204. If packed data is received, the hardware accelerator 204 may unpack the packed data for further processing.

Another core operation that may be performed by the hardware accelerator 204 may include decoding a block of coefficients. In particular, the hardware accelerator 204 may decode the compressed bit stream 112 until a whole block of coefficients is decoded. The hardware accelerator 204 may output the decoded block from the variable length decoder 102 without further processing by the programmable element 202. Alternatively, the hardware accelerator 204 may return the result of the decode operation to the programmable element 202 for further processing.

Another core operation performed by the hardware accelerator 204 may include the retrieval of a specified number of bits from the compressed bit stream 112, which may be forwarded to the programmable element 202 for further processing (as described below). Another core operation performed by the hardware accelerator 204 may include showing a specified number of bits from the compressed bit stream 112 to the programmable element 202 (without removal of such bits from the bit stream).

A more detailed description of the allocation of the decoding operations between the programmable element 202 and the hardware accelerator 204, according to some embodiments, is now set forth. The compressed bit stream 112 may include bits for a number of frames. For example, the compressed bit stream 112 may include frames of video. A sequence includes a number of the frames. For example, a one second sequence may include 30 frames. A frame of video may be partitioned into a number of macroblocks. Moreover, the macroblocks may include a number of blocks. Based on the compressed bit stream 112, the variable length decoder 102 may generate packets that include the sequence level data, the frame level data and the macroblock data.

Figure 3:
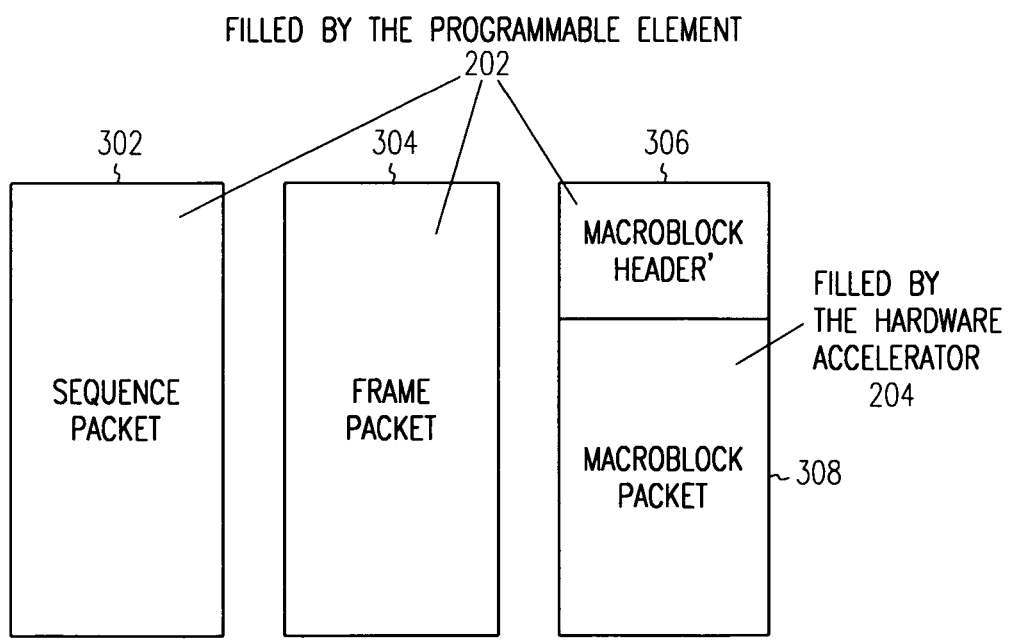
FIG. 3 illustrates various packets being generated by the variable length decoder 102 of FIG. 1, according to some embodiments of the invention.

Accordingly, FIG. 3 illustrates various packets being generated by a variable length decoder, according to some embodiments of the invention. In particular, FIG. 3 illustrates various packets being generated by the variable length decoder 102, according to some embodiments of the invention. As shown, the variable length decoder 102 may generate a sequence packet 302, a frame packet 304, a macroblock header 306 and a macroblock packet 308.

The sequence packet 302 may include the sequence level parameters decoded from the compressed bit stream 112. The sequence level parameters may include the size of the frames, the type of code used for the decoding, etc. The frame packet 304 may include frame level parameters decoded from the compressed bit stream 112. The frame level parameters may include the type of frame, whether level shifting is needed, whether quantization is needed, etc. The macroblock header 306 includes macroblock control information. The macroblock control information may include the type of encoding used to encode the macroblock data, the type and number of blocks therein, which blocks are within the compressed bit stream, whether motion prediction is used and for which blocks, the motion vectors for the motion prediction, etc.). The macroblock packet 308 may include the macroblock data from the compressed bit stream 112.

In some embodiments, the decoding of the sequence parameters may be specific to a particular coding standard. In some embodiments, the decoding of the frame level parameters may be specific to a particular coding standard. In some embodiments, the generation of the macroblock header 306 may be specific to a particular coding standard. The decoding of the macroblock packet may be based on at least partially on core operations that are common across multiple coding standards (as described above).

In some embodiments, the programmable element 202 may decode the packets that are specific to a particular decoding standard, while the hardware accelerator 204 may decode the packets that are at least partially common across multiple coding standards. Accordingly, as shown, the programmable element 202 may decode the sequence parameters for generation of the sequence packets 302. The programmable element 202 may also decode the frame-level parameters for generation of the frame packets 304.

Therefore, the hardware accelerator 204 may be hardwired to perform core operations that are common across multiple coding standards. The programmable element 202 may be programmable to handle the specifics of a particular standard. Accordingly, the instructions executed in the programmable element 202 may be updated to allow for the processing of new or updated standards. However, embodiments are not so limited. In some embodiments, the programmable element 202 may decode parts of the packets that are common across multiple standards. In some embodiments, the hardware accelerator 204 may decode parts of the packets that are specific to a particular standard.

Figure 4:
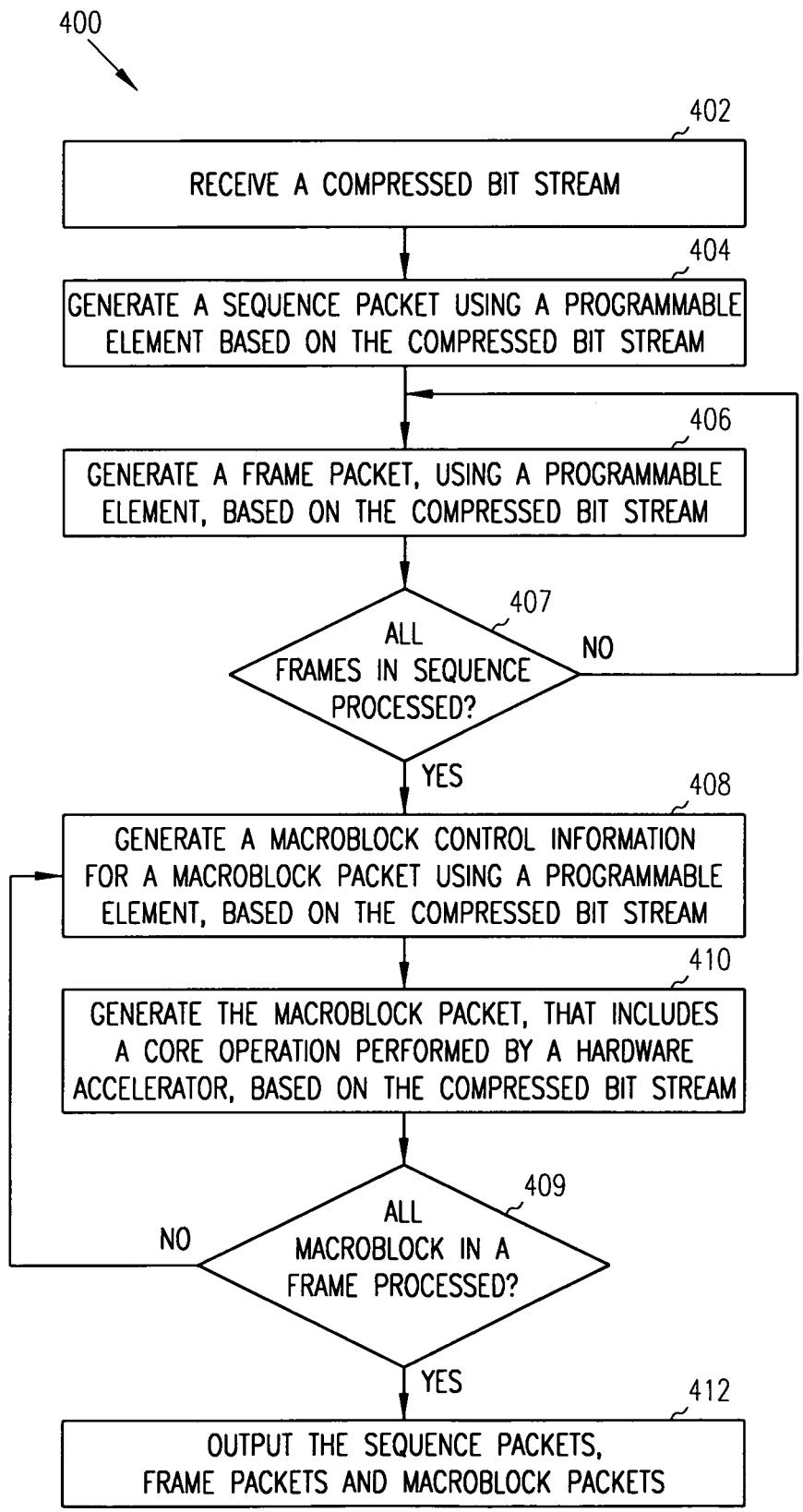
FIG. 4 illustrates a flow diagram for decoding, according to some embodiments of the invention.

A more detailed description of the operations of the variable length decoder 102, according to some embodiments, is now described. FIG. 4 illustrates a flow diagram for decoding, according to some embodiments of the invention. The flow diagram 400 illustrates the operations for processing a given sequence of video. Such operations may be repeatedly performed as additional sequences are received. The flow diagram 400 is described with reference to the components of FIG. 2. The flow diagram 400 commences at block 402.

At block 402, a variable length decoder receives a compressed bit stream. With reference to FIG. 2, the hardware accelerator 204 receives the compressed bit stream 112. The flow continues at block 404.

At block 404, the programmable element generates sequence packets based on the compressed bit stream. With reference to FIG. 2, the programmable element 202 may generate the sequence packets. In some embodiments, the programmable element 202 may use some core operations of the hardware accelerator 204 in generating the sequence data. The sequence data may be specific to a given coding standard. Therefore, the programmable element 202 may cause the hardware accelerator 204 to locate the sequence data in the compressed bit stream 112. The programmable element 202 may then generate one or more sequence packets that include the sequence data. In some embodiments, the programmable element 202 may cause the hardware accelerator 204 to retrieve a specified number of bits from the compressed bit stream 112. For example, the hardware accelerator 204 may locate a start code in the compressed bit stream 112. The sequence data may be X number of bits that are within compressed bit stream 112 after the start code location. Therefore, the programmable element 202 may cause the hardware accelerator 204 to locate the start code and retrieve the sequence data thereafter. The flow continues at block 406.

At block 406, the programmable element generates frame packets based on the compressed bit stream. Similar to the sequence packets, the frame packets may also be specific to a giving coding standard. With reference to FIG. 2, the programmable element 202 may generate frame packets. In some embodiments, the programmable element 202 may use some core operations of the hardware accelerator 204 in generating the frame data (e.g., locating and retrieval of the bits representative of the frame data). The flow continues at block 407.

At block 407, a determination is made of whether all of the frames in the sequence have been processed. The programmable element 202 may make this determination. In particular, for a given video coding standard, a given number of frames are within a sequence. Accordingly, the programmable element 202 may make this determination based on the type of video coding standard being processed. Upon determining that all of the frames in the sequence are not processed, control continues at block 406, where another frame packet is processed.

At block 408, upon determining that all of the frames in the sequence are processed, the programmable element generates a header for macroblock packets based on the compressed bit stream. Similar to the sequence and frame data, the macroblock control information may also be specific to a giving coding standard. With reference to FIG. 2, the programmable element 202 may generate macroblock control information. Such information may be stored in the header of a macroblock packet (as shown in FIG. 3). In some embodiments, the programmable element 202 may use some core operations of the hardware accelerator 204 in generating the macroblock control information (e.g., locating and retrieval of the bits representative of the macroblock control information). The flow continues at block 410.

At block 410, the variable length decoder generates the macroblock packet that includes a core operation performed by the hardware accelerator, based on the compressed bit stream. With reference to FIG. 2, the hardware accelerator 204 may perform any of a number of core operations that are common across multiple coding standards. For example, the hardware accelerator 204 may decode a specified number of bits, decode a block of coefficients, etc. The hardware accelerator 204 may generate the body of the macroblock packets based on the core operations. As described above, in some embodiments, the programmable element 202 may perform some operations in the generating of the body of the macroblock packets. The flow continues at block 409.

At block 409, a determination is made of whether all of the macroblock packets in the sequence have been processed. The programmable element 202 may make this determination. In particular, for a given video coding standard, a given number of macroblock packets are within a frame. Accordingly, the programmable element 202 may make this determination based on the type of video coding standard being processed. Upon determining that all of the macroblock packets in the sequence are not processed, control continues at block 408, where another macroblock packet is processed.

At block 412, upon determining that all of the macroblock packets in the sequence are processed, the variable length decoder outputs the sequence packets, the frame packets and the macroblock packets. With reference to FIG. 1, the variable length decoder 102 may output such packets for storage into the data storage and logic 114A. With reference to FIG. 2, in some embodiments, the hardware accelerator 204 may include internal buffers (not shown). The hardware accelerator 204 may store these packets into these internal buffers until a control command is received from the programmable element 202 to output these packets.

Figure 5:
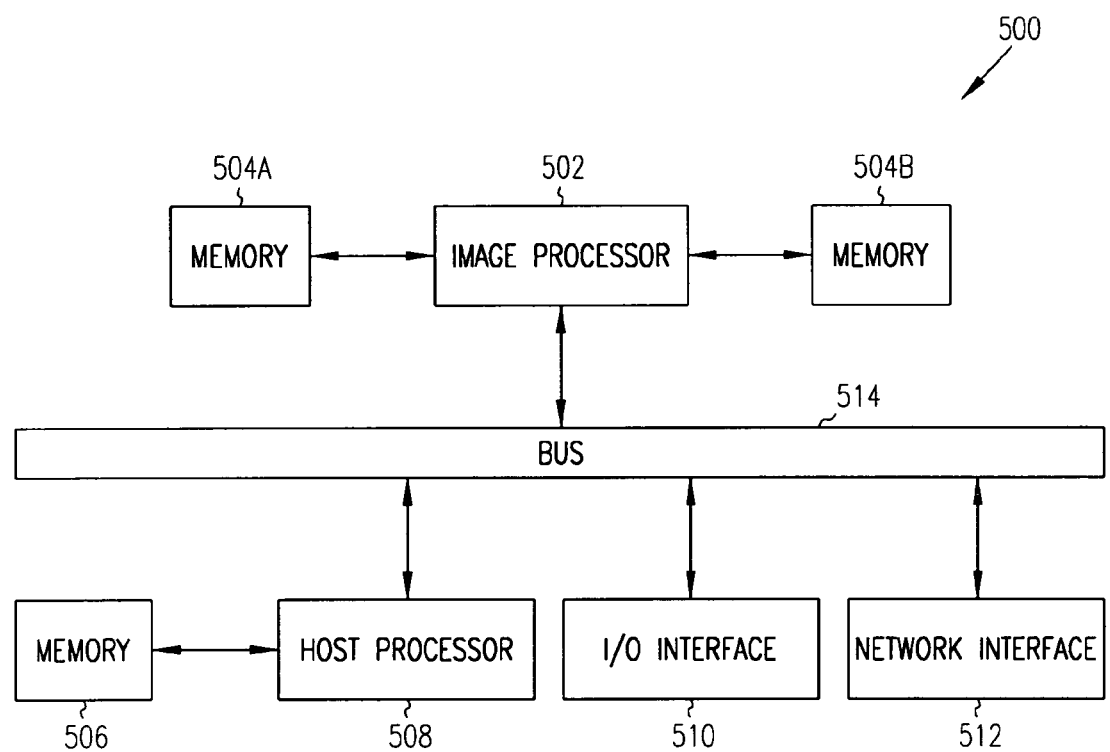
FIG. 5 illustrates a processor architecture for performing decoding operations, according to some embodiments of the invention.

The decoder architecture described herein may operate in a number of different environments, according to some embodiments used to execute such operations is now described. In particular, FIG. 5 illustrates a processor architecture that includes the buffer architecture for data organization, according to some embodiments of the invention. FIG. 5 illustrates a system 500 that includes an image processor 502 that includes the buffer architecture for data organization, as described above. For example, the image processor 502 may include the components of the system 100 of FIG. 1.

The image processor 502 is coupled to memories 504A-504B. In some embodiments, the memories 504A-504B are different types of random access memory (RAM). For example, the memories 504A-504B are double data rate (DDR) Synchronous Dynamic RAM (SDRAM).

The image processor 502 is coupled to a bus 514, which in some embodiments, may be a Peripheral Component Interface (PCI) bus. The system 500 also includes a memory 506, a host processor 508, a number of input/output (I/O) interfaces 510 and a network interface 512. The host processor 508 is coupled to the memory 506. The memory 506 may be different types of RAM (e.g., Synchronous Dynamic RAM (SDRAM), DRAM, DDR-SDRAM, etc.), while in some embodiments, the host processor 508 may be different types of general purpose processors. The I/O interface 510 provides an interface to I/O devices or peripheral components for the system 500. The I/O interface 510 may comprise any suitable interface controllers to provide for any suitable communication link to different components of the system 500. The I/O interface 510 for some embodiments provides suitable arbitration and buffering for one of a number of interfaces.

For some embodiments, the I/O interface 510 provides an interface to one or more suitable integrated drive electronics (IDE) drives, such as a hard disk drive (HDD) or compact disc read only memory (CD ROM) drive for example, to store data and/or instructions, for example, one or more suitable universal serial bus (USB) devices through one or more USB ports, an audio coder/decoder (codec), and a modem codec. The I/O interface 510 for some embodiments also provides an interface to a keyboard, a mouse, one or more suitable devices, such as a printer for example, through one or more ports. The network interface 512 provides an interface to one or more remote devices over one of a number of communication networks (the Internet, an Intranet network, an Ethernet-based network, etc.).

The host processor 508, the I/O interfaces 510 and the network interface 512 are coupled together with the image processor 502 through the bus 514. Instructions executing within the host processor 508 may configure the image processor 502 for different types of image processing. For example, the host processor 508 may configure the different components of the image processor 502 for decoding operations therein. Such configuration may include the types of data organization to be input and output from the data storage and logic 114 (of FIG. 1), whether the pattern memory 224 is used, etc. In some embodiments, the encoded video data may be input through the network interface 512 for decoding by the components in the image processor 502.

In the description, numerous specific details are set forth. However, it is understood that embodiments of the invention may be practiced without these specific details. In other instances, well-known circuits, structures and techniques have not been shown in detail in order not to obscure the understanding of this description. Numerous specific details such as logic implementations, opcodes, ways of describing operands, resource partitioning/sharing/duplication implementations, types and interrelationships of system components, and logic partitioning/integration choices are set forth in order to provide a more thorough understanding of the inventive subject matter. It will be appreciated, however, by one skilled in the art that embodiments of the invention may be practiced without such specific details. In other instances, control structures, gate level circuits and full software instruction sequences have not been shown in detail in order not to obscure the embodiments of the invention. Those of ordinary skill in the art, with the included descriptions will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention include features, methods or processes that may be embodied within machine-executable instructions provided by a machine-readable medium. A machine-readable medium includes any mechanism that provides (i.e., stores and/or transmits) information in a form accessible by a machine (e.g., a computer, a network device, a personal digital assistant, manufacturing tool, any device with a set of one or more processors, etc.). In an exemplary embodiment, a machine-readable medium includes volatile and/or non-volatile media (e.g., read only memory (ROM), random access memory (RAM), magnetic disk storage media, optical storage media, flash memory devices, etc.), as well as electrical, optical, acoustical or other form of propagated signals (e.g., carrier waves, infrared signals, digital signals, etc.)).

Such instructions are utilized to cause a general-purpose or special-purpose processor, programmed with the instructions, to perform methods or processes of the embodiments of the invention. Alternatively, the features or operations of embodiments of the invention are performed by specific hardware components that contain hard-wired logic for performing the operations, or by any combination of programmed data processing components and specific hardware components. Embodiments of the invention include software, data processing hardware, data processing system-implemented methods, and various processing operations, further described herein.

A number of figures show block diagrams of systems and apparatus for a decoder architecture, in accordance with some embodiments of the invention. A figure shows a flow diagram illustrating operations of a decoder architecture, in accordance with some embodiments of the invention. The operations of the flow diagram have been described with reference to the systems/apparatus shown in the block diagrams. However, it should be understood that the operations of the flow diagram may be performed by embodiments of systems and apparatus other than those discussed with reference to the block diagrams, and embodiments discussed with reference to the systems/apparatus could perform operations different than those discussed with reference to the flow diagram.

In view of the wide variety of permutations to the embodiments described herein, this detailed description is intended to be illustrative only, and should not be taken as limiting the scope of the inventive subject matter. What is claimed, therefore, are all such modifications as may come within the scope and spirit of the following claims and equivalents thereto. Therefore, the specification and drawings are to be regarded in an illustrative rather than a restrictive sense.

What is claimed is:

1. An apparatus comprising:
    a decoder to receive a compressed bit stream that is based on either of at least two different coding standards, wherein the decoder includes,
        a first unit to decode a first part of the compressed bit stream, said first part including a block of coefficients, said first unit to operate on portions of said compressed streams that are the same across both coding standards; and
        a programmable second unit to decode a second part of the compressed bit stream, said second part different from said first part, said second part being different in said two of the coding standards, said second unit to determine a selected type of video coding, determine a number of frames used in a sequence in the selected standard and determine for the selected sequence whether the number of frames have been processed for the selected video standard, said programmable second unit to cause the first unit to locate sequence data in said compressed bit stream and then said second unit to use said data to generate sequence packets.

2. The apparatus of claim 1, wherein the first unit is to decode at least a part of macroblock data from the compressed bit stream.

3. The apparatus of claim 2, wherein the second unit is to decode sequence data and frame data from the compressed bit stream.

4. The apparatus of claim 3, wherein the programmable second unit is to decode at least part of the sequence data and at least part of the frame data.

5. The apparatus of claim 2, wherein the first unit is to store the macroblock data into a macroblock packet and wherein the programmable second unit is to derive a header for the macroblock packet based on the compressed bit stream.

6. The apparatus of claim 1, wherein the coding standards include one or more of Moving Pictures Experts Group (MPEG)-2, MPEG-4 or Windows Media (WM)-9.

7. The apparatus of claim 1 wherein said decoder is a variable length decoder.

8. A method comprising:
    receiving encoded data that is encoded using a coding standard;
    decoding, using a hardware accelerator of a decoder, the encoded data, including a block of coefficients, that is based on a first operation that is common across multiple coding standards that includes the coding standard, the hardware accelerator configured to perform the first operation; and
    decoding, using a programmable element within the decoder, the encoded data that is based on a second operation that is unique to the coding standard, the programmable element configured to perform the second operation and to control the hardware accelerator by causing the hardware accelerator to locate sequence data in the encoded data, the programmable element further being programmable based on multiple coding standards, said second operation to determine a selected type of video coding, determine a number of frames used in a sequence in the selected standard and determine for the selected sequence whether the number of frames have been processed for the selected video standard, said element to use said sequence data to generate sequence packets;
    wherein the decoder comprises a variable length decoder.

9. The method of claim 8, wherein decoding, using the programmable element of the decoder, the encoded data comprises generating sequence data from the encoded data.

10. The method of claim 9, wherein decoding, using the programmable element of the decoder, the encoded data comprises generating frame data from the encoded data.

11. The method of claim 10, wherein decoding, using the hardware accelerator of a decoder, the encoded data comprises generating macroblock data from the encoded data.

12. The method of claim 11, wherein decoding, using the programmable element of the decoder, the encoded data comprises generating macroblock control information based on the encoded data.

13. The method of claim 8, wherein the multiple coding standards include Moving Pictures Experts Group (MPEG)-2, MPEG-4 or Windows Media (WM)-9.

* * * * *